US012660060B2

(12) United States Patent
Kovatchev

(10) Patent No.: US 12,660,060 B2
(45) Date of Patent: Jun. 16, 2026

(54) DRIVER CIRCUIT FOR SUPPLYING A CONSTANT CURRENT TO AN LED ARRANGEMENT

(71) Applicant: Continental Automotive Technologies GmbH, Hannover (DE)

(72) Inventor: Emil Kovatchev, Vienna (AT)

(73) Assignee: CONTINENTAL AUTOMOTIVE TECHNOLOGIES GMBH, Hannover (DE)

(*) Notice: Subject to any disclaimer, the term of this patent is extended or adjusted under 35 U.S.C. 154(b) by 36 days.

(21) Appl. No.: 18/956,645

(22) Filed: Nov. 22, 2024

(65) Prior Publication Data

US 2025/0185133 A1 Jun. 5, 2025

(30) Foreign Application Priority Data

Dec. 1, 2023 (DE) ......................... 102023212097.6

(51) Int. Cl.

*H05B 45/327* (2020.01)
*H05B 45/325* (2020.01)
*H05B 45/34* (2020.01)
*H05B 45/375* (2020.01)

(52) U.S. Cl.

CPC ......... *H05B 45/327* (2020.01); *H05B 45/325* (2020.01); *H05B 45/34* (2020.01); *H05B 45/375* (2020.01)

(58) Field of Classification Search

CPC .................. H05B 45/375; H05B 45/38; H05B 45/3725; H05B 45/14; H05B 45/385; H05B 45/46; H05B 45/44; H05B 45/325; H05B 45/347; H05B 45/382; H05B 45/48

See application file for complete search history.

(56) References Cited

U.S. PATENT DOCUMENTS

| | | | | |
|---|---|---|---|---|
| 10,426,004 | B2 | 9/2019 | Stoeger et al. | |
| 12,108,506 | B2 | 10/2024 | Kovatchev | |
| 2019/0110345 | A1* | 4/2019 | Ichikawa | F21S 41/16 |
| 2021/0160989 | A1* | 5/2021 | Ichikawa | H05B 45/325 |
| 2022/0117056 | A1* | 4/2022 | Sohma | H05B 45/325 |

FOREIGN PATENT DOCUMENTS

| | | | |
|---|---|---|---|
| DE | 102017214056 | B3 | 10/2018 |
| DE | 102020205960 | B4 | 12/2021 |

* cited by examiner

*Primary Examiner* — Wei (Victor) Y Chan

(74) *Attorney, Agent, or Firm* — Buchanan Ingersoll & Rooney PC

(57) ABSTRACT

A driver circuit for supplying a constant current to an LED arrangement, which is formed by a step-down converter including, in series with a coil, a current measuring resistor measuring current through the coil. A two-point control circuit switches a first switching element on or off depending on the measured current through the coil to keep the average current through the LED arrangement constant. A current amplifier circuit connected to the current measuring resistor detects current flowing through it and, by superimposing an offset voltage applied to one of the inputs thereof by an offset voltage source, can measure both positive and negative current. The output terminal thereof is connected to the input terminals of the two-position control circuit. The offset voltage is superimposed on the threshold voltages thereof. A starting pulse circuit is provided, and connected via a diode to the control input of the first switching element.

6 Claims, 5 Drawing Sheets

DRIVER CIRCUIT FOR SUPPLYING A CONSTANT CURRENT TO AN LED ARRANGEMENT

CROSS REFERENCE TO RELATED APPLICATIONS

This application claims priority to German Patent Application No. 10 2023 212 097.6, filed Dec. 1, 2023, the contents of such application being incorporated by reference herein.

FIELD OF THE INVENTION

The invention relates to a driver circuit for supplying a constant current to an LED arrangement. The driver circuit is formed by a step-down converter formed by a first switching element, which is connected between a supply voltage and an output capacitor, and a coil connected in series therewith, wherein the connecting point of the first switching element and the coil and a reference potential point forming the connecting point of the supply voltage and the output capacitor are connected via a rectifying element, and a current measuring resistor that measures the current through the coil is arranged in series with the coil. The driver circuit also comprises a two-point control circuit that switches the first switching element on or off depending on the current through the coil measured by means of the current measuring resistor in order to keep the average current through the LED arrangement constant, wherein the two-point control circuit is formed by a window comparator to which a first and a second threshold voltage source supply a high and a low threshold voltage which determine the values of the current flowing through the coil, upon reaching which values the first switching element is switched on and off again, wherein the window comparator has a bistable trigger circuit connected downstream thereof, the first output terminal of which, which has a signal level that indicates that the low threshold value is reached, is connected to the control terminal of the first switching element.

BACKGROUND OF THE INVENTION

Such a driver circuit is known from DE 10 2020 205 960 B4 and also from DE 10 2017 214 056 A1, each incorporated herein by reference, and is illustrated in FIG. 1 by way of a sketch.

LEDs (light emitting diodes)—often in the form of light-emitting diode arrangements, for example as a series circuit of multiple light emitting diodes—are also increasingly being used for lighting purposes in motor vehicles thanks to their efficiency, compact and robust design and their durability. The LEDs are always operated by constant current. The suitable power sources are for this purpose often implemented as step-down converters (buck converters) with a current control loop.

Common concepts for the operation of LED voltage converters are with fixed frequency control hysteretic control (two-point controller)

with constant on/off time control.

The hysteretic controllers are particularly popular because they are easy and inexpensive to implement and have a high control bandwidth, which is advantageous if the LEDs are operated with PWM (that is to say produce forced load jumps) or if the supply voltage varies greatly, as is usual in the automotive sector, for example.

A typical LED driver in buck topology is schematically illustrated in FIG. 1. The transistors Qhs, Qls, together with the coil Lbk and the capacitors Cin and Cout form the classic buck topology. The current through the coil Lbk is detected by a control block. This then generates the PWM signals gh, gl, so that the light emitting diodes LED1 . . . . LEDN of a light emitting diode arrangement are driven by a predetermined constant current.

In the circuit of FIG. 1, the signal at the current measuring resistor Rsense is supplied as control information to the two comparators Cvalley and Cpeak. Said comparators actuate a trigger circuit RStrigger, but they require the level shifters LSp and LSv, which transmit their output signals from the high-voltage domain Vhi to the low-voltage domain, where the rest of the controller is located. The outputs of the trigger circuit RStrigger are actuated by the AND gates Ahi, Alo and the dimming PWM generator Vdim in such a way that they allow the two transistors Qhs, Qls to be switched according to the control concept during the dimming PWM-ON phase, while they switch off both transistors in the dimming PWM-OFF phase.

The LED current corresponds exactly to the average value of the coil current and is defined by the two reference voltage sources Vvalley and Vpeak. However, this again requires some level shifters, which transmit the threshold voltages or reference voltage values for Vvalley and Vpeak from the low-voltage domain to the high-voltage domain Vhi in analog or digital form.

However, there are two problems with the use of such a known step-down converter.

On the one hand, a negative coil current is not possible. Since the valley comparator Cvalley can only work with input voltages greater than or equal to zero/ground, in the best case it is able to identify a coil current equal to zero but not a negative coil current. In the best case, the converter can thus operate in so-called BCM (boundary conduction mode). Taking into account the current ripple in the coil, the result is a minimum mean value of the LED current that can no longer be undershot. It depends, among other things, on the coil and current measuring resistance value and in many cases leads to impracticably high switching frequencies. A high-inductance coil that extends the current range downwards is again impractical for the high current ranges, as it can tolerate only little saturation current at the same form factor. For clarity, FIG. 2 shows the CCM (continuous current mode) in the upper illustration and the BCM (boundary conduction mode) in the middle illustration.

On the other hand, switching delays cause LED current faults. The driver circuit for the switching transistors Qhs and Qls has a specific response time, measured from the moment when the coil current reaches the desired peak or valley value to the moment when the switches actually turn on. The response times of the comparators, logic gates, gate drivers and level shifters between high-voltage and low-voltage domains, among other things, contribute to this delay. For example, the sum of these delays could be 40-80 ns, which is already up to 10% for a switching period of 800 ns, for example. Since these delays usually also have different durations for the peak and valley case, the actual mean value of the coil current (which is the same as the LED current) shifts relative to the target value. The switching frequency is also lower than expected and the coil current ripple is larger. This shift is more pronounced as a percentage in the case of lower LED current specifications. This is illustrated in FIG. 3.

SUMMARY OF THE INVENTION

An aspect of the invention aims to solve these problems.

An aspect of the invention is a generic driver circuit, as described above, in that a current amplifier circuit is provided, which is connected to the current measuring resistor to detect the current flowing through it and which, by superimposing an offset voltage applied to one of the inputs thereof by an offset voltage source, can measure both a positive and a negative current, and the output terminal of which is connected to the input terminals of the window comparator that are not supplied with threshold values, in that the offset voltage is also superimposed on the high and the low threshold voltage, and in that a starting pulse circuit is provided, which is connected via a diode to the control input of the first switching element.

Such a circuit design according to an aspect of the invention also enables control by negative valley current, as shown in the bottom illustration of FIG. 2. In this so-called FCM (forced continuous mode) operation, it would be possible to theoretically set the average LED current to zero and even to a negative and to actively control it accordingly.

In one development of the driver circuit, the rectifying element is formed by a second switching element, wherein the second output terminal of the bistable trigger circuit, the signal level of which is used to indicate the reaching of the high threshold voltage, is connected to the control terminal of the second switching element.

This means that an active rectifier, which in particular has lower losses, is implemented.

In order to be able to influence the current flow through the LED arrangement and thus dim the brightness, in one design of the driver circuit the two output terminals of the bistable trigger circuit are each connected via an AND gate to the respective control terminals of the first and the second switching element, wherein a respective further terminal of the AND gate is connected to a dimming circuit that is set up to emit a pulse-width-modulated signal.

In this case, the gate outputs can advantageously be connected via gate drivers, which drive the switching elements.

In one development of the driver circuit according to an aspect of the invention, a compensator circuit is provided, which has a subtracting circuit, to the inputs of which a current setpoint value and the current value measured by the current measuring circuit are supplied and the output terminal of which, to which a fault current is applied, is connected via a third controllable switching element to the input terminal of a filter circuit, the output terminal of which is connected to the first and the second threshold voltage source, wherein the filtered fault current is added to the threshold voltages and wherein the control terminal of the third switching element is connected to the dimming circuit.

If a fault current is mentioned here, this basically means a fault current signal, since the fault current can also be represented by a voltage, as it typically drops across a current measuring resistor.

The compensator circuit is thus used to determine the deviation of the actual LED current from the target LED current and—taking into account the control behavior of the converter—to reduce this deviation to a minimum.

In one development of the current amplifier circuit, it is formed by a non-inverting addition amplifier, the inverting terminal of which is connected to the terminal of the coil connected to the LED arrangement and the non-inverting terminal of which is connected to the terminal of the coil connected to the first switching element and to the offset voltage source.

The current amplifier circuit can also be designed differently, for example by discrete transistor current mirrors.

BRIEF DESCRIPTION OF THE DRAWINGS

An aspect of the invention is described in greater detail below on the basis of an exemplary embodiment with the aid of figures. In the figures.

DETAILED DESCRIPTION OF PREFERRED EMBODIMENTS

Figure 1:
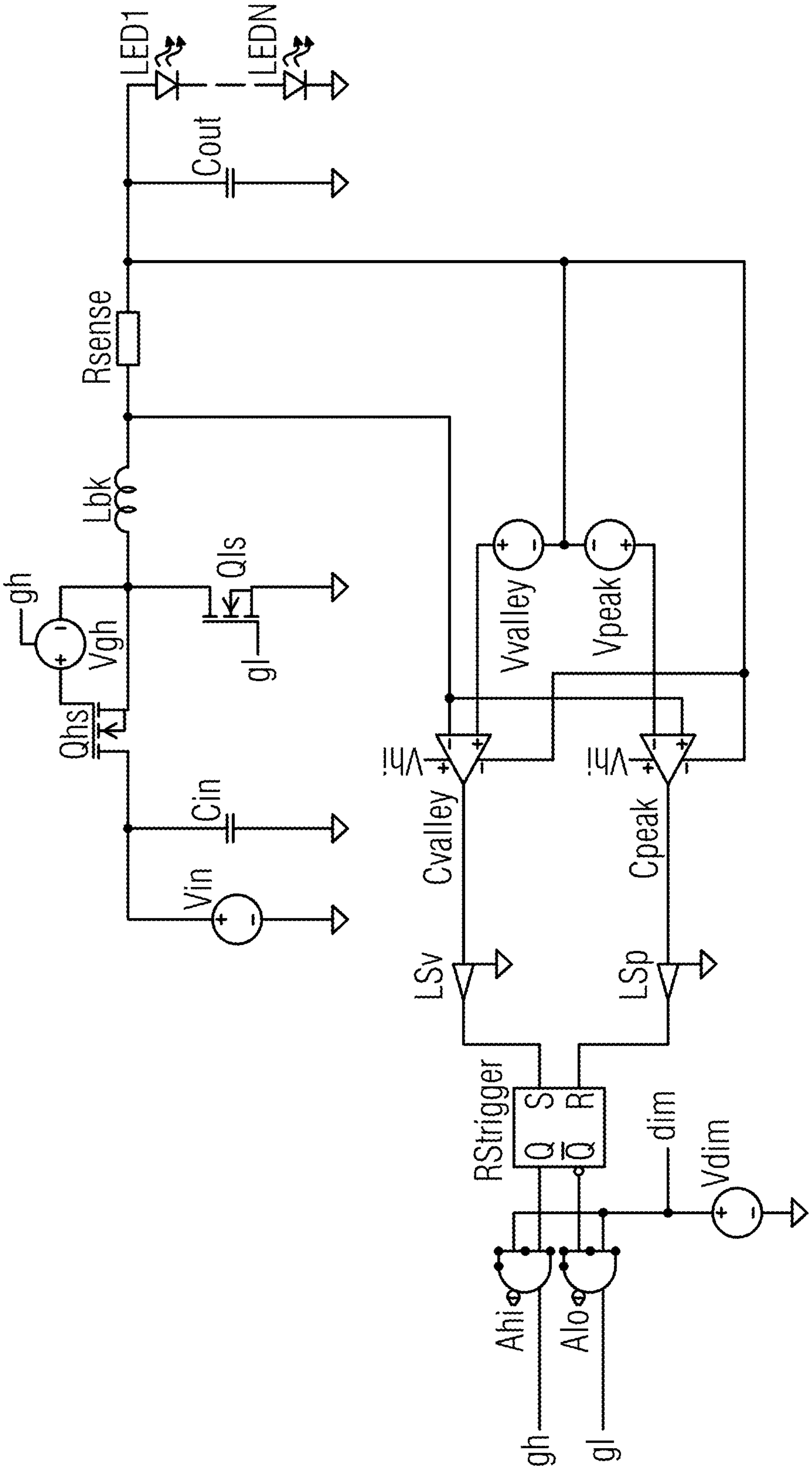
FIG. 1 shows a driver circuit in the form of a step-down converter for an LED arrangement according to the prior art.
Figure 2:
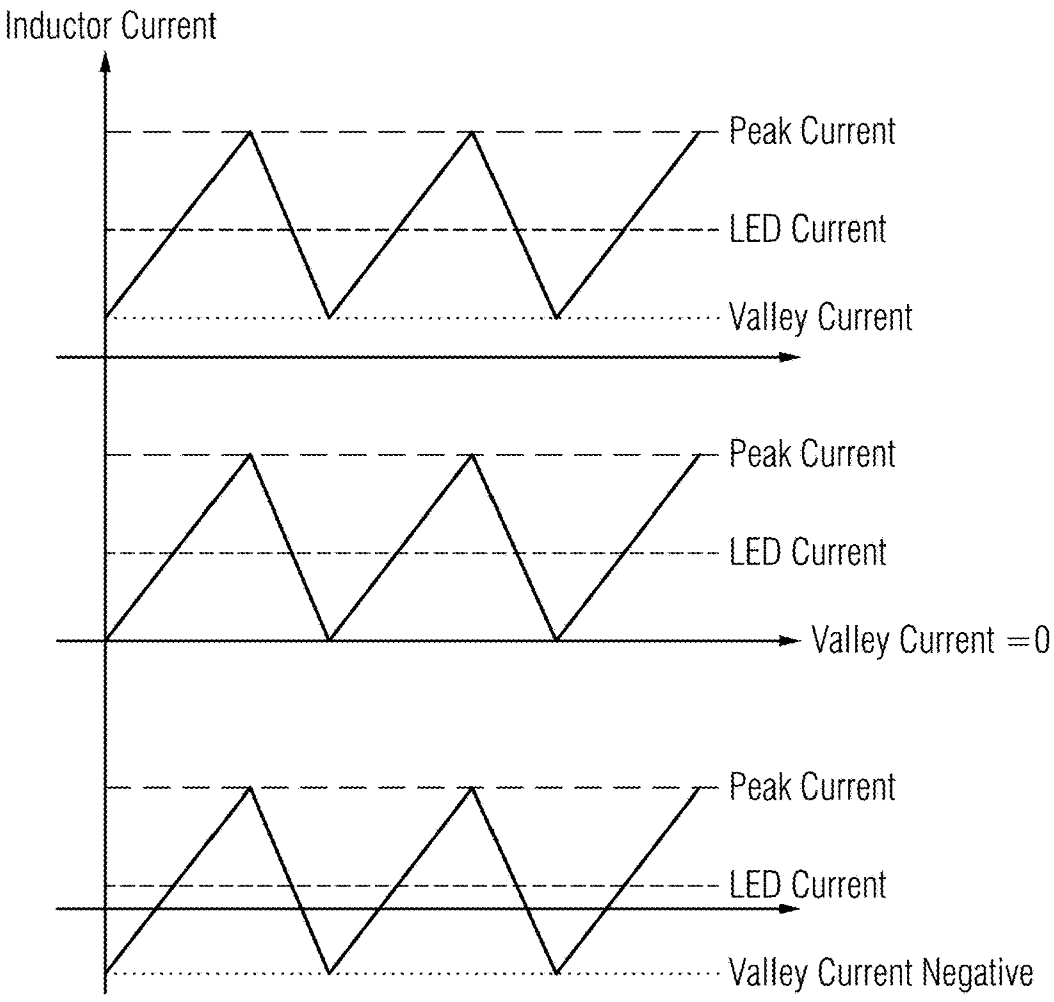
FIG. 2 shows curve profiles of the coil current for various operating states of the driver circuit.
Figure 3:
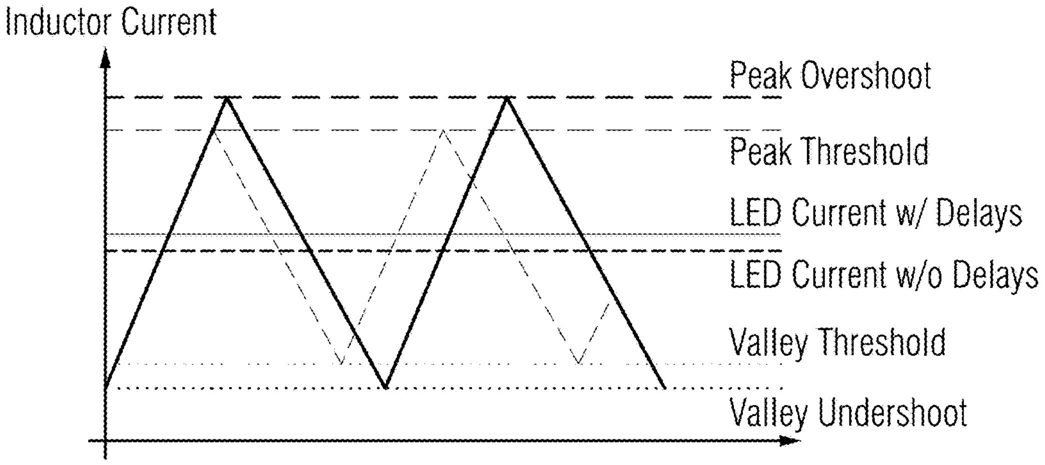
FIG. 3 shows curve profiles of the coil current of the driver circuit to illustrate the overshooting and undershooting due to switching delays.

FIGS. 1 and 3 have already been discussed above in the discussion of the prior art and the problems thereof.

Figure 4:
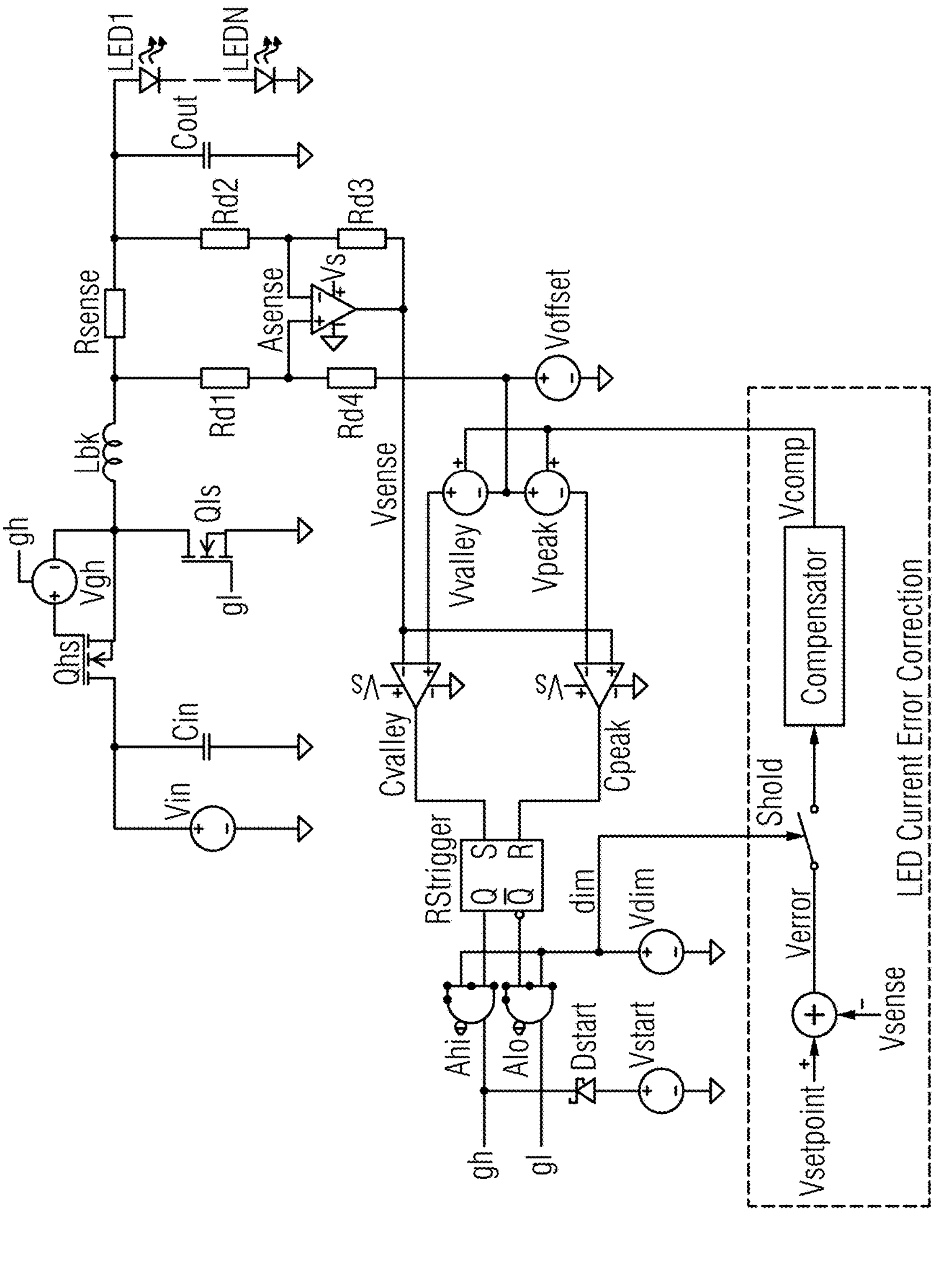
FIG. 4 shows an exemplary embodiment of a driver circuit according to an aspect of the invention in the form of a step-down converter for an LED arrangement.

FIG. 4 now shows an exemplary embodiment of a driver circuit according to the invention, in which the step-down converter (buck converter) is of identical design to the prior art; it goes without saying here that other forms of step-down converters can also be used here. A voltage source Vin, with which an input capacitor Cin is connected in parallel as a supporting capacitor, is connected to the input terminal of the step-down converter. The rectifying element is designed as a second switching element Qls in the form of a MOSFET transistor. The first switching element Qhs is also designed as a MOSFET transistor.

A current amplifier circuit Asense is configured as a differential high-side amplifier with offset, using resistors Rd1 . . . Rd4, for which purpose an offset voltage source Voffset is connected to the non-inverting input thereof. Thanks to its configuration, said amplifier can bidirectionally detect the current through the current measuring resistor Rsense and thus through the coil Lbk. The current amplifier circuit Asense refers the voltage drop at the current measuring resistor Rsense to the low voltage domain of Vs, where most of the rest of the circuit—except for the high-side gate driver Vgh—is located. The output voltage Vsense of the current amplifier circuit Asense behaves as follows:

$$Vsense = Voffset \text{ if the current through the coil } Lbk = 0 \quad (1)$$

$$Vs >= Vsense >= Voffset \text{ if the current through the coil } Lbk \text{ is positive} \quad (2)$$

$$Voffset >= Vsense >= 0 \text{ if the current through the coil } Lbk \text{ is negative} \quad (3)$$

A two-point control circuit is formed by a window comparator composed of two comparators Cvalley and Cpeak to which a first and a second threshold voltage source supply a high Vpeak and a low threshold voltage Vvalley which determine the values of the current Vsense flowing through the coil, upon reaching which values the first switching element Qhs is switched on and off again, wherein the window comparator has a bistable trigger circuit RStrigger connected downstream thereof, the first output terminal Q of which, which has a signal level that indicates that the low threshold value Vvalley is reached, is connected to the control terminal of the first switching element.

The set input S of the trigger circuit RStrigger is connected to the output of the valley comparator Cvalley and the reset input R is connected to the output of the peak comparator Cpeak. The inverting output Q/is connected to the control input of the second switching element Qls.

The connection of the outputs Q, Q/of the trigger circuit RStrigger are each connected to the control inputs of the first Qhs or second switching element Qls via an AND gate. The second inputs of the AND gates are connected to a dimming circuit Vdim that outputs a pulse-width-modulated signal.

A starting pulse circuit Vstart is provided, which is connected via a diode Dstart to the control input of the first switching element Qhs.

A compensator circuit is also provided, which has a subtracting circuit, to the inputs of which a current setpoint value Vsetpoint and the current value Vsense measured by the current measuring circuit are supplied and the output terminal of which, to which a fault current Verror is applied, is connected via a third controllable switching element Shold to the input terminal of a filter circuit Compensator, the output terminal of which is connected to the first and the second threshold voltage source, wherein the filtered fault current Vcomp is added to the threshold voltages Vvalley, Vpeak and wherein the control terminal of the third switching element Shold is connected to the dimming circuit Vdim.

The voltages Vvalley, Vpeak, Vcomp of the three voltage sources satisfy the equations:

$$Vvalley = (Vsetpoint + Vcomp)^{*}(1 - \text{ripple}/200) \tag{4}$$

$$Vpeak = (Vsetpoint + Vcomp)^{*}(1 + \text{ripple}/200) \tag{5}$$

$$Vcomp = Hc(Verror) = Hc(Vsetpoint - Vsense) \tag{6}$$

with the following parameters

| | |
|---|---|
| ripple | desired coil current ripple, valley to peak, in % |
| Hc | transfer function of the compensator, adjustable |
| Vcomp | output by the compensator, actuating control signal |
| Vsense | output by the LED current measuring amplifier Asense |
| Vsetpoint | target value specification for the average LED current |
| Vpeak | specification of the coil peak current |
| Vvalley | specification of the coil valley current |

The voltage references Vvalley and Vcomp must also be able to assume negative values. However, the sum must be $$|Vvalley| + Voffset >= 0, \tag{7}$$

so that the comparators Cvalley, Cpeak always operate with an input signal greater than or equal to zero.

In practice, the threshold voltages Vvalley and Vpeak are most likely to be realized by DAC converters that are prestressed with a bias voltage, so that equations (4), (5), (7) can already be converted into the digital control signals for the DAC converters.

The task of the compensator unit (LED current error correction block) is to minimize the deviation of the actual LED current from the target. For this purpose, an error signal Verror is calculated as the difference between the setpoint Vsetpoint and actual current Vsense and is adjusted to the conditions of the converter using a compensator block Compensator. These include the open-loop transfer function of the power plant and, above all, the delays caused by the switching transistors, the gate drivers, the comparators and the entire digital logic system of the control unit. In order to counteract the delays and the resulting overshoot/undershoot in the coil current Vsense, the output signal Vcomp of the compensator Compensator is fed to the threshold voltages Vvalley and Vpeak as a signed correction value and added thereto.

Since the LED driver can be dimmed using a dimming circuit Vdim and the compensator Compensator usually also has an integrating element, the integration in the PWM-off phases of the dimming circuit Vdim is stopped by the third switching element Shold. Thus, an empty integration and the resulting increase in the error signal is avoided and the operating point of the controller is stored for the next PWM-on cycle—the output from the compensator Compensator is "frozen".

The compensator block can be realized analogously using a subtractor and a compensator of type I, II, III or a PI or PID controller, based on operational amplifiers. However, it may also be implemented digitally by discretizing Vsense or Verror using an ADC and the digital error signal being fed to a digital compensator, which processes it in the digital domain by a transfer function of the above type (for example 2p2z, 3p3z, PI, PID) and generates the digital control signal Vcomp. If the reference specifications for the comparators Cpeak and Cvalley are also—as described above—executed digitally using DAC converters, the entire control unit can be completely digitally designed except for the comparators and the current amplifier circuit Asense. The compensator does not need to be fast, because the delays caused by gates, comparators, level shifters etc. are relatively static and are mainly dependent on temperature and sample. A dynamic, cycle-by-cycle readjustment is not necessary and therefore, simple integrating compensators, which keep the error signal to a minimum, are also usually sufficient.

The voltage source Vstart has a specific role. To this end, the starting behavior of the proposed converter must be taken into account.

Case 1. CCM (continuous current mode, coil current always >0)

Figure 5:
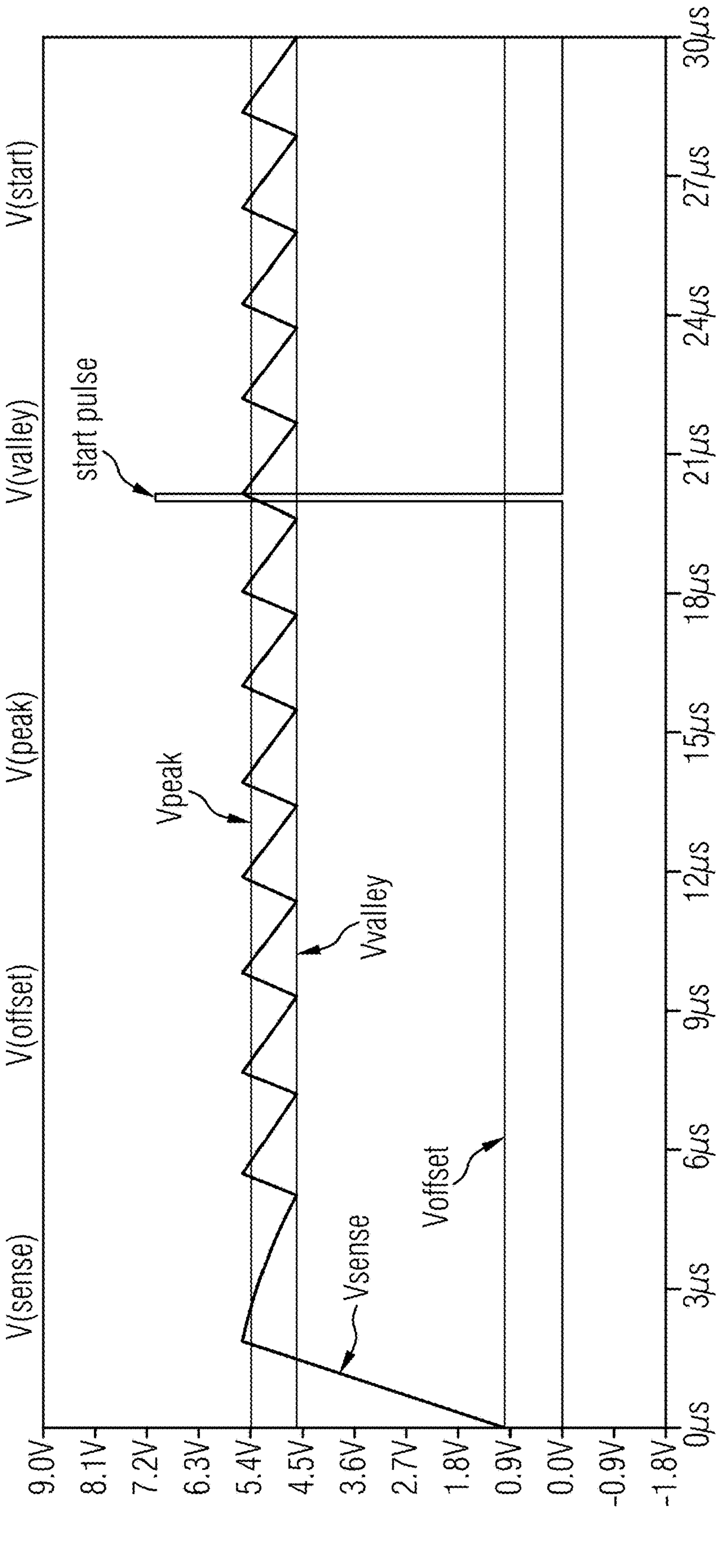
FIG. 5 shows the current profile of the coil current in CCM or BCM operation of the driver circuit.
Figure 6:
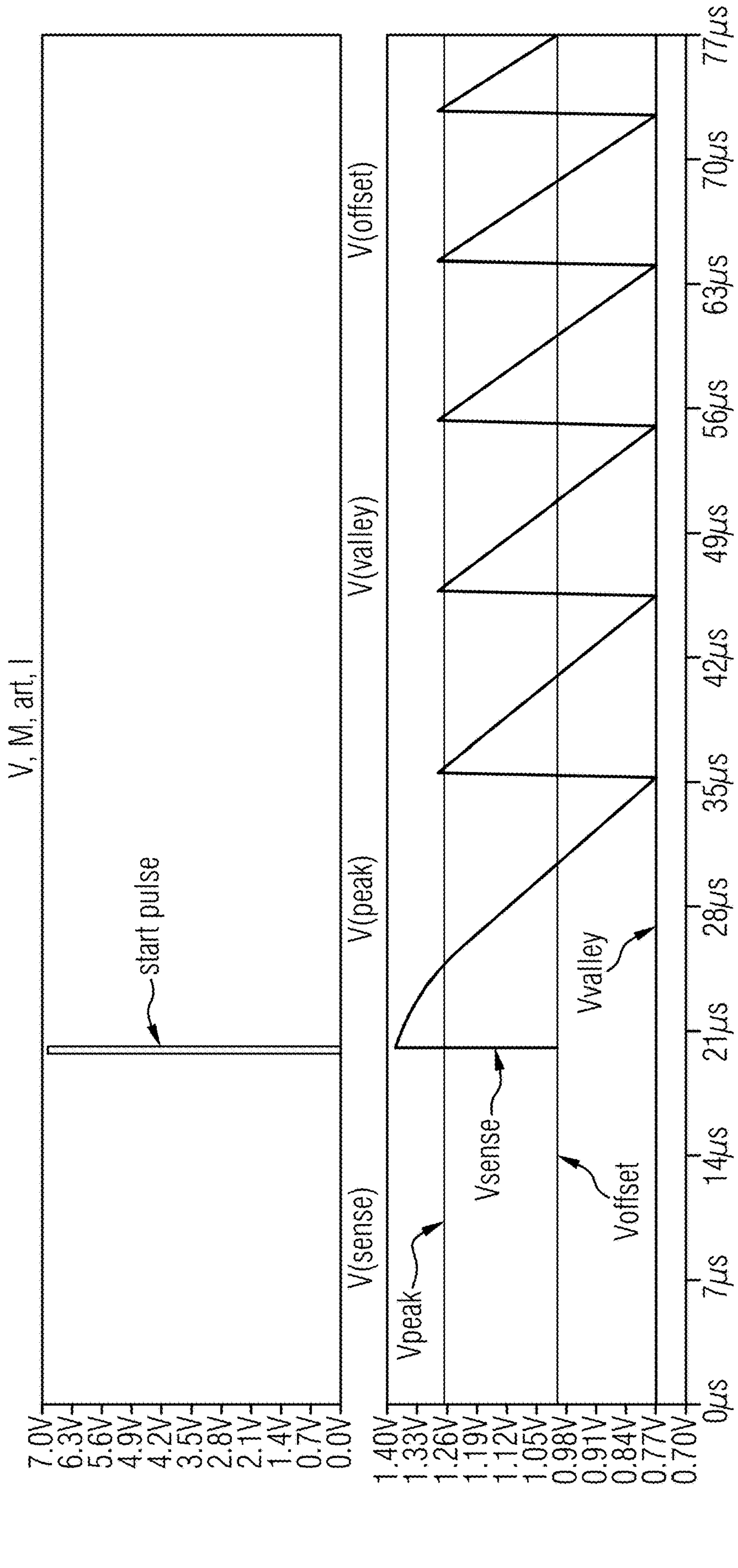
FIG. 6 shows the current profile of the coil current in FCM operation of the driver circuit with effect of the starting pulse.

In CCM mode, that is to say if large LED currents are required and therefore the valley current in the coil may be greater than 0, the condition Vvalley>Voffset is satisfied. Vsense is in the first instance approximately equal to Voffset as no current flows through the current measuring resistor Rsense. Thus, Vvalley>Vsense. Consequently, the comparator Cvalley has a voltage Vvalley at the non-inverting input higher than that at its inverting input. The comparator output is set to "high", the trigger circuit RStrigger sets its non-inverting output Q corresponding to "high", the first switching element Qhs becomes conductive and the coil current increases. This ensures a smooth start of the converter; no explicit starting pulse is required. The current profile is illustrated in FIG. 5.

In FCM mode, that is to say if small LED currents are required and therefore the valley current in the coil must be lower than 0, the condition Vvalley<Voffset is satisfied. Vsense is in the first instance approximately equal to Voffset as no current flows through the current measuring resistor Rsense. Thus, Vvalley<Vsense. Consequently, the comparator Cvalley has a voltage Vvalley at the non-inverting input thereof lower than that at its inverting input. The comparator output is set to "low", the trigger stage RStrigger has its non-inverting output Q corresponding to "low", the first switching element Qhs is non-conductive and the LED converter cannot be started.

The start is only possible in the manner according to an aspect of the invention using the additional starting pulse circuit Vstart, which actuates the first switching element Qhs with a narrow starting pulse so that the current measuring resistor Rsense is energized and the comparator Cvalley can switch over. The converter can only start using this pulse.

An aspect of the invention provides the advantage of a very wide LED current setting range. Due to the possibility of control in a forced continuous mode (FCM), the described hysteretic converter allows a very wide current setting range from a few milliamperes to several amperes without the need to adapt the power components. The known hysteretic drivers cannot keep up—they require larger inductance and shunt values for smaller LED currents, so that the coil ripple becomes smaller and thus the coil current remains positive even at the valley point.

The proposed converter also allows for negative current flow and provides small LED currents even with small inductance and shunt values, which in turn are advantageous for high-current operation.

Efficient compensation of switching delays (undershoot and overshoot compensation) is achieved. Through direct evaluation of the mean LED current and the use of an integrated compensator, which dynamically adjusts the peak and valley points of the coil current, the LED current error can be brought to almost zero.

This results in the following innovative features:

By using an offset for the peak and valley comparators Cpeak and Cvalley, as well as for the measuring amplifier Asense, the function of the converter with negative coil currents is made possible. This enables the converter function in FCM (forced continuous mode).

The starting pulse circuit Vstart allows the converter to start up in situations where negative coil current is required (that is to say at low LED currents).

The compensator block significantly reduces the LED current error. The block can also be conveniently executed digitally and therefore very flexibly in terms of parametrization.

The output of the compensator is easily integrated into a control loop by equations (4) and (5). The equations are also suitable for digital implementation.

The invention claimed is:

1. A driver circuit for supplying a constant current to an LED arrangement, comprising:

- a step-down converter formed by a first switching element, which is connected between a supply voltage and an output capacitor (Cout), and a coil connected in series therewith, wherein the connecting point of the first switching element and the coil and a reference potential point forming the connecting point of the supply voltage (Vin) and the output capacitor are connected via a rectifying element, and a current measuring resistor that measures the current through the coil is arranged in series with the coil,
- a two-point control circuit that switches the first switching element on or off depending on the current through the coil measured by the current measuring resistor in order to keep the average current through the LED arrangement (LED1. . . . LEDN) constant, wherein the two-point control circuit is formed by a window comparator to which a first and a second threshold voltage source supply a high and a low threshold voltage which determine the values of the current flowing through the coil, upon reaching which values the first switching element is switched on and off again, wherein the window comparator has a bistable trigger circuit connected downstream thereof, the first output terminal of which, which has a signal level that indicates that the low threshold value is reached, is connected to the control terminal of the first switching element, wherein

- a current amplifier circuit is provided, which is connected to the current measuring resistor to detect the current flowing through it and which, by superimposing an offset voltage applied to one of the inputs thereof by an offset voltage source, can measure both a positive and a negative current, and the output terminal of which is connected to the input terminals of the window comparator that are not supplied with threshold values,
- the offset voltage is also superimposed on the high and the low threshold voltage, and
- a starting pulse circuit is provided, which is connected via a diode to the control input of the first switching element.

2. The driver circuit as claimed in claim 1, wherein the rectifying element is formed by a second switching element, wherein the second output terminal of the bistable trigger circuit, the signal level of which is used to indicate the reaching of the high threshold voltage, is connected to the control terminal of the second switching element.

3. The driver circuit as claimed in claim 1, wherein the two output terminals of the bistable trigger circuit are each connected via an AND gate to the respective control terminals of the first and the second switching element, wherein a respective further terminal of the AND gate is connected to a dimming circuit that is set up to emit a pulse-width-modulated signal.

4. The driver circuit as claimed in claim 3, wherein a compensator circuit is provided, which has a subtracting circuit, to the inputs of which a current setpoint value and the current value measured by the current measuring circuit are supplied and the output terminal of which, to which a fault current is applied, is connected via a third controllable switching element to the input terminal of a filter circuit,

- the output terminal of which is connected to the first and the second threshold voltage source, wherein the filtered fault current is added to the threshold voltages and wherein the control terminal of the third switching element is connected to the dimming circuit.

5. The driver circuit as claimed in claim 1 wherein the current amplifier circuit is formed by a non-inverting addition amplifier, the inverting terminal of which is connected to the terminal of the coil connected to the LED arrangement and the non-inverting terminal of which is connected to the terminal of the coil connected to the first switching element and to the offset voltage source.

6. The driver circuit as claimed in claim 2, wherein the two output terminals of the bistable trigger circuit are each connected via an AND gate to the respective control terminals of the first and the second switching element, wherein a respective further terminal of the AND gate is connected to a dimming circuit that is set up to emit a pulse-width-modulated signal.

* * * * *